United States Patent
Nieschwitz et al.

(10) Patent No.: US 11,484,165 B2
(45) Date of Patent: Nov. 1, 2022

(54) VACUUM INLET VALVE ASSEMBLY

(71) Applicant: H-P Products, Inc., Louisville, OH (US)

(72) Inventors: Darrell V. Nieschwitz, Louisville, OH (US); Greg A. Calderone, Canton, OH (US); Shawn C. Metz, Louisville, OH (US)

(73) Assignee: H-P PRODUCTS, INC., Louisville, OH (US)

( * ) Notice: Subject to any disclaimer, the term of this patent is extended or adjusted under 35 U.S.C. 154(b) by 529 days.

(21) Appl. No.: 16/580,165

(22) Filed: Sep. 24, 2019

(65) Prior Publication Data

US 2020/0100634 A1 Apr. 2, 2020

Related U.S. Application Data

(60) Provisional application No. 62/756,140, filed on Nov. 6, 2018.

(51) Int. Cl.
*A47L 5/38* (2006.01)
*A47L 9/24* (2006.01)
*F16L 27/12* (2006.01)

(52) U.S. Cl.
CPC .................. *A47L 5/38* (2013.01); *A47L 9/242* (2013.01); *F16L 27/1273* (2019.08)

(58) Field of Classification Search
CPC .......... A47L 5/38; A47L 9/0072; A47L 9/242; A47L 9/248; F16L 11/15; F16L 27/1273
See application file for complete search history.

(56) References Cited

U.S. PATENT DOCUMENTS

| | | | |
|---|---|---|---|
| 2,701,103 A | 10/1950 | Coleman | |
| 2,943,698 A | 7/1960 | Bishop | |
| 2,953,806 A | 9/1960 | Walker | |
| 3,173,164 A | 3/1965 | Congdon | |
| 3,520,725 A | 7/1970 | Hamrick | |
| 3,565,103 A | 2/1971 | Maselek et al. | |
| 3,672,630 A | 6/1972 | Naumburg et al. | |
| 4,336,427 A * | 6/1982 | Lindsay | A47L 5/38 15/314 |
| 4,688,596 A | 8/1987 | Liebmann et al. | |
| 5,263,502 A | 11/1993 | Dick | |
| 5,535,784 A | 7/1996 | Saville et al. | |
| 5,914,816 A | 6/1999 | Soto et al. | |
| 6,459,056 B1 * | 10/2002 | Graham | A47L 9/242 15/314 |
| 7,624,472 B2 * | 12/2009 | Ambrose | A47L 5/38 15/314 |

(Continued)

*Primary Examiner* — Marc Carlson

(74) *Attorney, Agent, or Firm* — Sand, Sebolt & Wernow Co., LPA

(57) ABSTRACT

A vacuum inlet valve assembly has a housing configured to be mounted exterior to a preexisting wall in a structure such that the housing is connected with a conduit and the conduit is exterior to the wall and retains a hose therein, and the hose is adapted to be pulled out from a stored position within the conduit external from the wall to an extracted position, and when in the extracted position, an end cap or hose plug on the hose is releasably connected with a connection assembly in the housing. A portion of the conduit is clear or translucent or transparent so an operator can watch the end cap or hose plug approach the connection assembly.

20 Claims, 7 Drawing Sheets

(56) References Cited

U.S. PATENT DOCUMENTS

| | | |
|---|---|---|
| 9,993,126 B2 | 6/2018 | Harman |
| 2015/0190023 A1* | 7/2015 | Nieschwitz ............. A47L 9/244 |
| | | 15/315 |
| 2017/0332858 A1* | 11/2017 | Nieschwitz ............. A47L 9/244 |
| 2018/0153364 A1* | 6/2018 | Nieschwitz ............. F16L 29/00 |
| 2020/0100634 A1* | 4/2020 | Nieschwitz ............. A47L 9/242 |
| 2020/0178745 A1* | 6/2020 | Nieschwitz ............... A47L 5/38 |
| 2020/0281431 A1* | 9/2020 | Nieschwitz ............... A47L 5/38 |
| 2021/0145226 A1* | 5/2021 | Nieschwitz ............... B60P 3/36 |
| 2021/0196091 A1* | 7/2021 | Nieschwitz ............. A47L 9/242 |

* cited by examiner

VACUUM INLET VALVE ASSEMBLY

CROSS REFERENCES TO RELATED APPLICATIONS

This application claims the benefit of U.S. Provisional Patent Application Ser. No. 62/756,140, filed Nov. 6, 2018; the disclosure of which is entirely incorporated herein by reference.

This application claims the benefit of International Design Application, Registration No. DM/200618, filed Sep. 27, 2018; the disclosure of which is entirely incorporated herein by reference.

This application claims the benefit of Canadian Industrial Design Application, Serial No. 183727, filed Sep. 27, 2018; the disclosure of which is entirely incorporated herein by reference.

BACKGROUND

Technical Field

The present disclosure relates generally to a vacuum inlet valve assembly for a central vacuum system. More particularly, the present disclosure relates to a vacuum inlet valve assembly that is to be coupled with a preexisting wall on a structure such that the vacuum inlet valve assembly is not configured to be inside the wall.

Background Information

Central vacuum systems for home and commercial use have been used for many years, examples of which are shown in U.S. Pat. Nos. 2,943,698 and 3,173,164. These systems generally are comprised of a main vacuum source which is usually mounted in the basement or other locations in the structure or closely adjacent thereto. The vacuum source is connected to various dedicated inlet valves in the structure by conduits or tubing. These inlet valves, also referred to as valve boxes in the industry, are mounted in a wall, inside of a cabinet or in and on other structures by various types of flanges, brackets, etc. Some examples are shown in U.S. Pat. Nos. 2,953,806, 3,520,725, 4,336,427, 6,459,056, and 7,624,472. Additionally, some central vacuum systems include secondary inlet valves, or which are generally referred to as secondary inlets or auxiliary inlets.

SUMMARY

Issues continue to exist with inlet valve assemblies inasmuch as they are typically required to be constructed at the same time as the structure within which it resides. When the conventional inlet valve assemblies discussed above are constructed with the structure, the inlet valve assemblies are set within the wall. Thus, a need continues to exist for an inlet valve assembly that can be installed on a wall, exterior thereof, after the completion of the construction of the structure.

In one aspect, an exemplary embodiment of the present disclosure may provide a vacuum inlet valve assembly comprising: a housing configured to be mounted exterior to a preexisting wall in a structure such that a housing is connected with a conduit and the conduit is exterior to the wall and retains a hose therein, and the hose is adapted to be pulled out from a stored position within the conduit external from the wall to an extracted position, and when in the extracted position, an end cap or hose plug on the hose is releasably connected with a connection assembly in the housing. A portion of the conduit is clear or translucent or transparent so an operator can watch the end cap or hose plug approach the connection assembly.

In another aspect, an exemplary embodiment of the present disclosure may provide a vacuum inlet valve assembly comprising: a housing having an upper cylindrical portion; a sleeve seal disposed within the upper cylindrical portion; a conduit coupled with the upper cylindrical portion and sealed with the sleeve seal; a lower wall of the housing that defines an aperture; a ball seal disposed within the aperture sized to seal an open end of a hose; and a rear end of the housing that is mounted on a preexisting wall to dispose the vacuum inlet valve exterior of the preexisting wall. This exemplary embodiment or another exemplary embodiment may further provide an aperture formed near a lower end of the sleeve seal sized to receive a cylindrical portion of the housing therethrough. This exemplary embodiment or another exemplary embodiment may further provide a spring disposed within the cylindrical portion configured to move a pin into engagement with a channel formed in a hose plug, wherein the spring is disposed through the aperture formed near the lower end of the sleeve seal. This exemplary embodiment or another exemplary embodiment may further provide a vacuum hose exterior the preexisting wall that is disposed within the conduit. This exemplary embodiment or another exemplary embodiment may further provide a lower terminal end of the conduit disposed within the upper cylindrical portion. This exemplary embodiment or another exemplary embodiment may further provide a ledge extending radially inward from an inner surface of the sleeve seal, wherein the lower terminal end of the conduit engages the ledge. This exemplary embodiment or another exemplary embodiment may further provide at least a portion of the conduit that is clear to enable a vacuum hose within the conduit to be viewed. This exemplary embodiment or another exemplary embodiment may further provide wherein the portion of the conduit that is clear is about two feet in length. This exemplary embodiment or another exemplary embodiment may further provide a connection assembly having upper portion and a lower portion. This exemplary embodiment or another exemplary embodiment may further provide a tapered opening formed in the upper portion that is aligned with upper cylindrical portion and the conduit, and an uppermost ledge of the tapered opening engages a ledge of the sleeve seal. This exemplary embodiment or another exemplary embodiment may further provide at least one nub on the sleeve seal that is disposed in a cutout portion of the upper cylindrical portion shaped complementary to the at least one nub. This exemplary embodiment or another exemplary embodiment may further provide a first sidewall; a narrow portion positioned between an upper portion of the first sidewall and a lower portion of the first sidewall. This exemplary embodiment or another exemplary embodiment may further provide wherein the upper portion of the first sidewall has a greater width than the narrow portion and wherein the lower portion of the first sidewall has a greater width than the narrow portion but less than the width the upper portion.

In yet another aspect, an exemplary embodiment of the present disclosure may provide a method comprising: mounting a vacuum inlet valve assembly exterior to a preexisting wall within a structure; coupling a conduit to the vacuum inlet valve assembly, wherein the conduit is exterior to the preexisting wall; disposing a hose within the conduit; moving an end of the hose towards the vacuum inlet valve assembly through the conduit exterior to the preexisting wall; coupling the end of the hose to vacuum inlet valve assembly exterior to the preexisting wall; and moving air through the hose in response to operation of a vacuum source. This exemplary embodiment or another exemplary embodiment may further provide altering a direction of air movement through the hose (either by reversing a fan within the vacuum source or by moving the opposite end of the hose to a blow hole on the vacuum source); and blowing air outwardly through a nozzle of the hose. This exemplary embodiment or another exemplary embodiment may further provide viewing the end of the hose through a clear portion of the conduit exterior to the preexisting wall This exemplary embodiment or another exemplary embodiment may further provide unsealing a nozzle on the hose from a ball seal on the vacuum inlet valve assembly; extracting the hose from the vacuum inlet valve assembly; and moving the end of the house downwardly through the clear portion of the conduit exterior the preexisting wall. This exemplary embodiment or another exemplary embodiment may further provide engaging pins in the vacuum inlet valve assembly with a channel formed in the end of the hose; rotating the end of the hose about an axis; depressing the pins with cams formed in the end of the hose during rotation of the end of the hose; and pulling the end of the hose downwardly while the pins are depressed to remove the end of the hose from the vacuum inlet valve assembly.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

A vacuum inlet valve assembly is depicted throughout the figures generally at 10. The vacuum inlet valve assembly 10, in accordance with one aspect of the present disclosure, is a supplemental vacuum inlet valve for a central vacuum cleaning system. The vacuum inlet valve assembly 10 of the present disclosure is configured to be a supplementary valve inasmuch as it is designed to be installed on a wall after the wall was constructed. Stated otherwise, the vacuum inlet valve assembly 10 of the present disclosure is an inlet valve for a central vacuum cleaning system that is installed in the structure or home after construction of the structure or home is completed. One such exemplary installation location for the vacuum inlet valve assembly 10 is in a garage, wherein an installer mounts the assembly 10 on one of the interior garage walls. Portions of the vacuum inlet valve assembly 10 may differ from other whole home or central vacuum cleaning system valves in that it is not inset into the wall or attached to the wall during the construction of home or structure.

Figure 1:
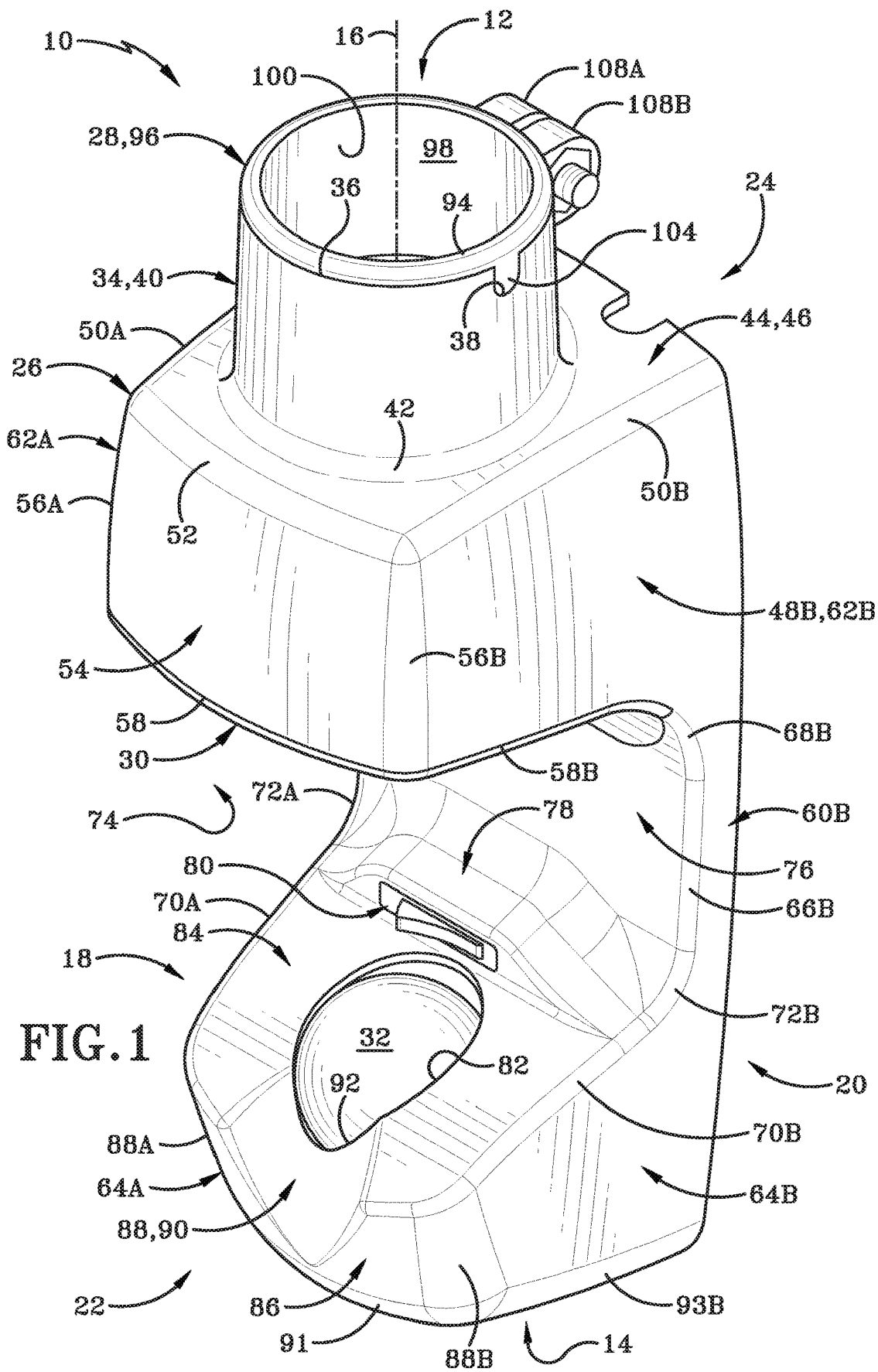
FIG. 1 is a top perspective view of a vacuum inlet valve assembly in accordance with the present disclosure.
Figure 2:
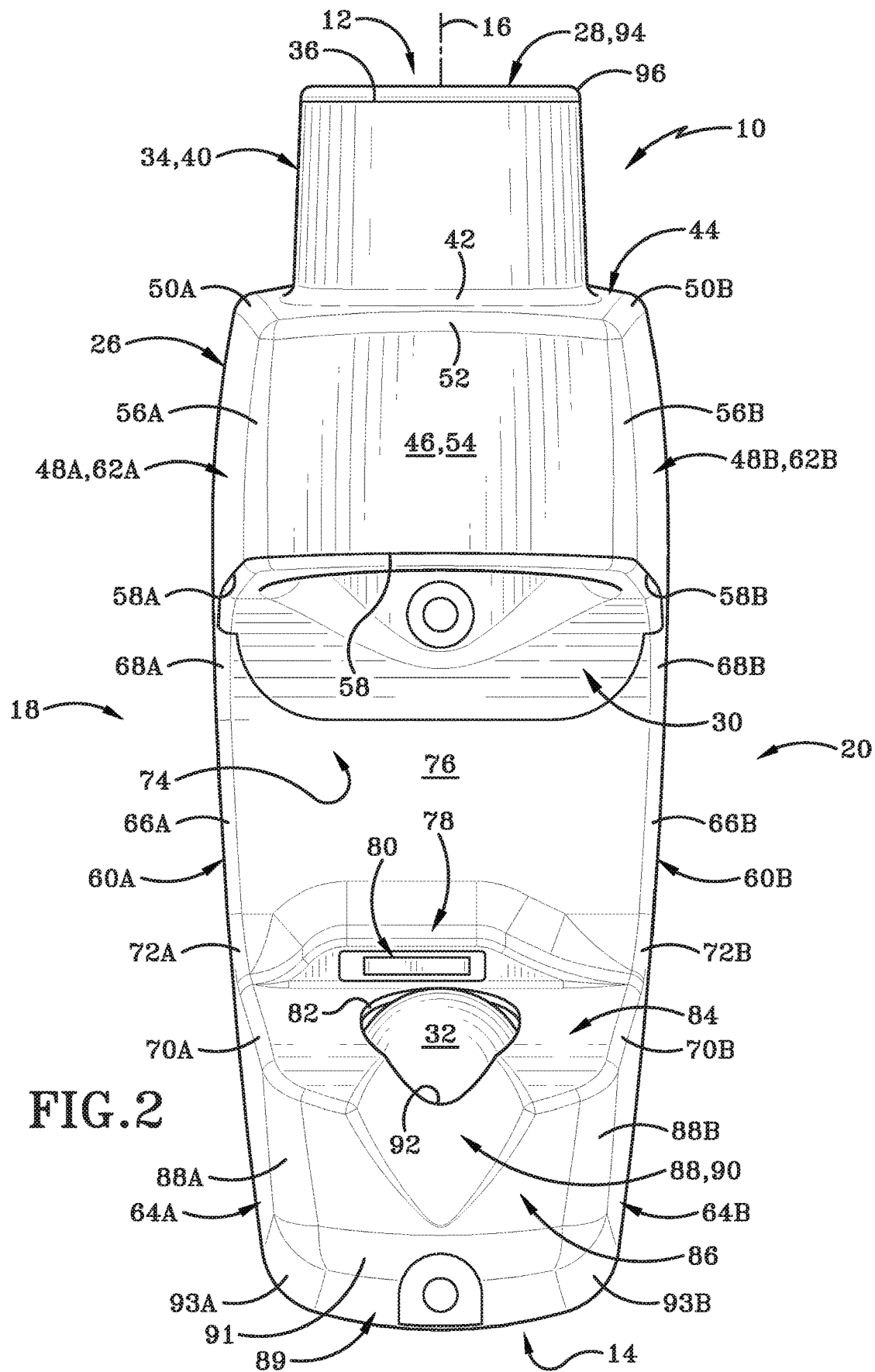
FIG. 2 is a front elevation view of the vacuum inlet valve assembly.
Figure 3:
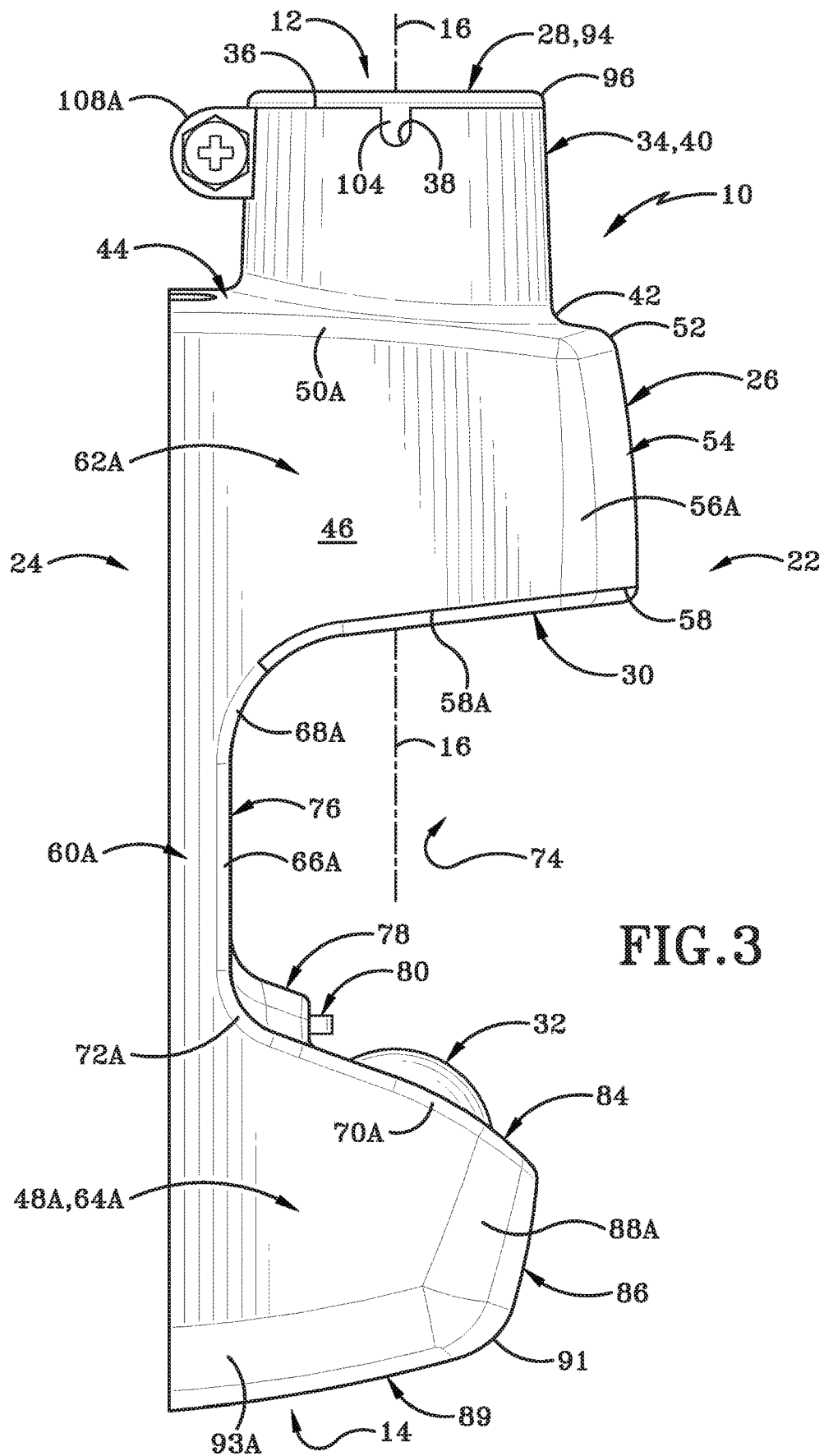
FIG. 3 is a first side elevation view of the vacuum inlet valve assembly.

FIG. 1-FIG. 3 depict the vacuum inlet valve assembly 10 as including a top 12 opposite a bottom 14 defining a longitudinal center axis 16 therebetween. In one particular embodiment, the longitudinal axis 16 is aligned in a vertical direction. Vacuum inlet valve assembly 10 may further include a first side 18 opposite a second side 20 defining a first transverse direction therebetween. Vacuum inlet valve assembly 10 may further include a front end or first end 22 opposite a rear end or second end 24 defining a second transverse axis that is perpendicular to the longitudinal axis 16 and the first transverse axis defined between first side 18 and second side 20.

Vacuum inlet valve assembly 10 may further include a housing 26, a cylindrical seal 28, a connection assembly 30 within the housing 26, and a ball seal 32. In one particular embodiment, the housing 26 may be formed from a single monolithic unibody material that is substantially continuous and formed or molded with the structural features described herein. As such, it is to be understood that portions of the housing 26 discussed below may be characterized as different features with corresponding reference elements designating the different features of the monolithic unibody material defining the housing 26. However, it clearly understood that the monolithic unibody material may be separated into separate component without departing from the scope of the present disclosure. Further, while it contemplated that housing 26 will be formed or molded from a polymer material, any material shall suffice that will structurally support the assembly 10 and the other components that are attached to the assembly, such as a vacuum hose or a vacuum conduit.

Housing 26 includes an upper cylindrical portion 34 extending vertically downward from an upper circular edge 36 extending circumferentially around longitudinal axis 16. Circular edge 36 is interrupted by a downwardly extending concave edge 38. In one particular embodiment, there are two downwardly extending concave edges 38 associated with each side of the housing 26. More particularly, a first downwardly extending concave edge 38 is positioned diametrically opposite a second concave edge 38 relative to the longitudinal axis 16. A cylindrical wall 40 extends downwardly from edge 36 to a bottom end of the wall 40 that is connected with a rounded fillet 42 that connects the bottom end of the cylindrical wall 40 of the cylindrical portion 34 to a generally horizontal wall 44. Horizontal wall 44 includes an upwardly facing top surface opposite a downwardly facing bottom surface. The outer surface of the horizontal wall 44 and the outer surface of the cylindrical portion 34 are smooth and continuous and uniform with each other such as to collectively define a collective outer surface 46 of the housing 26. Horizontal wall 44 is a generally planar portion of the housing that is oriented to lie approximately perpendicular to the axis 16 below the cylindrical portion 34, and lie generally in a plane along the first transverse axis and the second transverse axis.

Two side walls extend downwardly from horizontal wall 44. Namely, a first sidewall 48A associated with the first side 18 of vacuum inlet valve assembly 10 and a second sidewall 48B associated with the second side 20 of the vacuum inlet valve assembly 10. Sidewalls 48A, 48B extend downwardly from an edge 50A, 50B, respectively. Edges 50A, 50B are spaced apart and generally parallel to each other. However, as will be described in greater detail below, some portions of the housing 26 may taper inwardly towards each other relative from the rear to the front when viewed from above. As such, edge 50A and edge 50B may slightly angle inwardly towards each other relative to the second transverse axis defined between the front 22 and the rear end 24 of vacuum inlet valve assembly 10. A transverse edge 52 may extend between edge 50A and edge 50B near the front ends of edges 50A, 50B adjacent the front of housing 26. A front wall 54 may be convexly bowed outwardly and extend between vertical edges 56A and 56B that connect the front wall 54 with the respective sidewalls 48A, 48B. The bowed front wall 54 includes an outer surface opposite an inner surface. The outer surface of the curved wall 54 is substantially uniform in continuous with the outer surface of the sidewall 48A and the sidewall 48B and the wall 44 so as to collectively define the collective outer surface 46 of the housing 26. The bowed front wall 54 is disposed vertically below the cylindrical portion 34 and the horizontal wall 44. The bowed front wall 54 is positioned forwardly from the first sidewall 48A and the second sidewall 48B.

A lower portion of front wall 54 terminates at a lower edge 58. The lower edge 58 extends transversely outward and rearwardly along the second transverse axis and downwardly so as to bound a portion of the second sidewall 48B and bound a portion of the first sidewall 48A. A portion of lower edge 58 that extends rearwardly and downwardly from the front portion of lower edge 58 is denoted as 58A with respect to the first side 18 of the vacuum inlet valve assembly 10 and is denoted as 58B with respect to the second side 20 of the vacuum inlet valve assembly 10. In one particular embodiment, edge 58 is below edges 50A, 50B and transverse edge 52. Edges 56A, 56B extend generally vertically between transverse edge 52 and lower edge 58. Further, the frontal portion of edge 58 is positioned forwardly from the portions 58A, 58B that extend rearwardly and downwardly to respectively bound the sidewalls 48A, 48B.

As depicted in FIG. 3, first sidewall 48A is shown in a side elevation view and portions of the first sidewall 48A are described with reference elements ending in "A" designations. For brevity, it is to be understood that corresponding features of the second sidewall 48B are mirroredly structured relative to the longitudinal vertical axis 16. For example, narrow portion 60A of sidewall 48A has a corresponding narrow portion 60B on the second sidewall 48B. However, as shown in FIG. 3 and for brevity, mirroredly duplicated portions of the second sidewall 48B are not further detailed, but it will be understood that when a reference element ending in a "B" designation that the component is the same as that having the same reference element and a corresponding "A" designation.

Narrow portion 60A is positioned between an upper portion 62A of first sidewall 48A and a lower portion 64A of first wall 48A. The upper portion 62A of the first sidewall 48A has a greater width measured in the direction of the second transverse axis between the front 22 and the rear end 24 of the vacuum inlet valve assembly 10 than the width of the narrow portion 60A measured in the same second transverse axis. The width of the lower portion 64A of the first sidewall 48A is greater than the width in the second transverse axis of the narrow portion 68A, but less than the width in the second transverse axis of the upper portion 62A. The front of the narrow portion 60A is bound by an edge 66A that connects with edge 58A at a rounded downwardly concaved corner 68. Edge 66A extends downwardly from the rounded corner 68 to a lower edge 70A meeting at a rounded corner 72A. Lower portion 64A of the first sidewall 78 is bound at it upper end by the lower edge 70A. Collectively, edge 58A, the rounded corner 68A, edge 66A, rounded corner 72A, and edge 70A define a recessed region 74 as configured to receive a nozzle end of a vacuum hose when the hose is in the stored position and contained by the vacuum inlet valve assembly 10.

A wall 76 is bound between the rounded corners 68A, 68B and the vertical edges 66A, 66B and the lower rounded corners 72A, 72B. Wall 76 is aligned generally orthogonally to first sidewall 48A and second sidewall 48B. Near the bottom of wall 76 is a raised convex surface 78 that retains a switch 80 that is in operative communication with an electrically boss or circuit that turns on and turns off the vacuum device to initiate suction through the hose when the hose is removed, at least partially, from the vacuum inlet valve assembly 10. Wall 76 is below the upper portion 62A of the first sidewall 48A and below the upper portion 62B of the second sidewall 48B. Similarly, the wall 76 is disposed below the bowed front wall 54, the horizontal wall 44, and the cylindrical portion 34.

A lower wall 84 defines a partially annular cutout or aperture 82 through which the ball seal 32 is disposed. The ball seal 32 may be spring activated to move substantially in a vertical direction along the longitudinal axis 16 through the aperture 82. The lower wall is positioned at an angle relative to the wall 76 and is generally lower than the same. For example, the lower wall 84 connects with the generally lowermost portion of wall 76 and extends outwardly therefrom towards the front of the housing 26.

A lower front wall 86 is connected with the foremost portion of the lower wall 84. The front wall 86 extends between a lower vertical edge 88A and a lower vertical edge 88B, coupling the lower wall 86 to the lower portion 64A of the first sidewall 48A and the lower portion 64B of the second sidewall 48B, respectively. The lower front wall 86 may be interrupted by a cutout region 88 that is bound by a V-shaped wall 90 defining a portion of the edge that defines aperture 82. Particularly, a V-shaped edge 92 defines a frontal portion of the edge of the aperture 82 within which ball seal 32 resides. As will be described in greater detail below, the V-shaped wall 90 and the cooperative V-shaped edge 92 are sized so as to receive an end of a hose extending through the vacuum inlet valve assembly 10. A bottom wall 89 is connected to the lower front wall 86 via a rounded edge 91 extending in the direction of the first transverse axis. The lowermost portion of the V-shaped wall 90 is positioned slightly above the edge 91. The bottom wall is connected to the first and second sidewalls 48A, 48B by bottom edges 93A, 93B, respectively, which extend in the direction of the second transverse axis.

Figure 5:
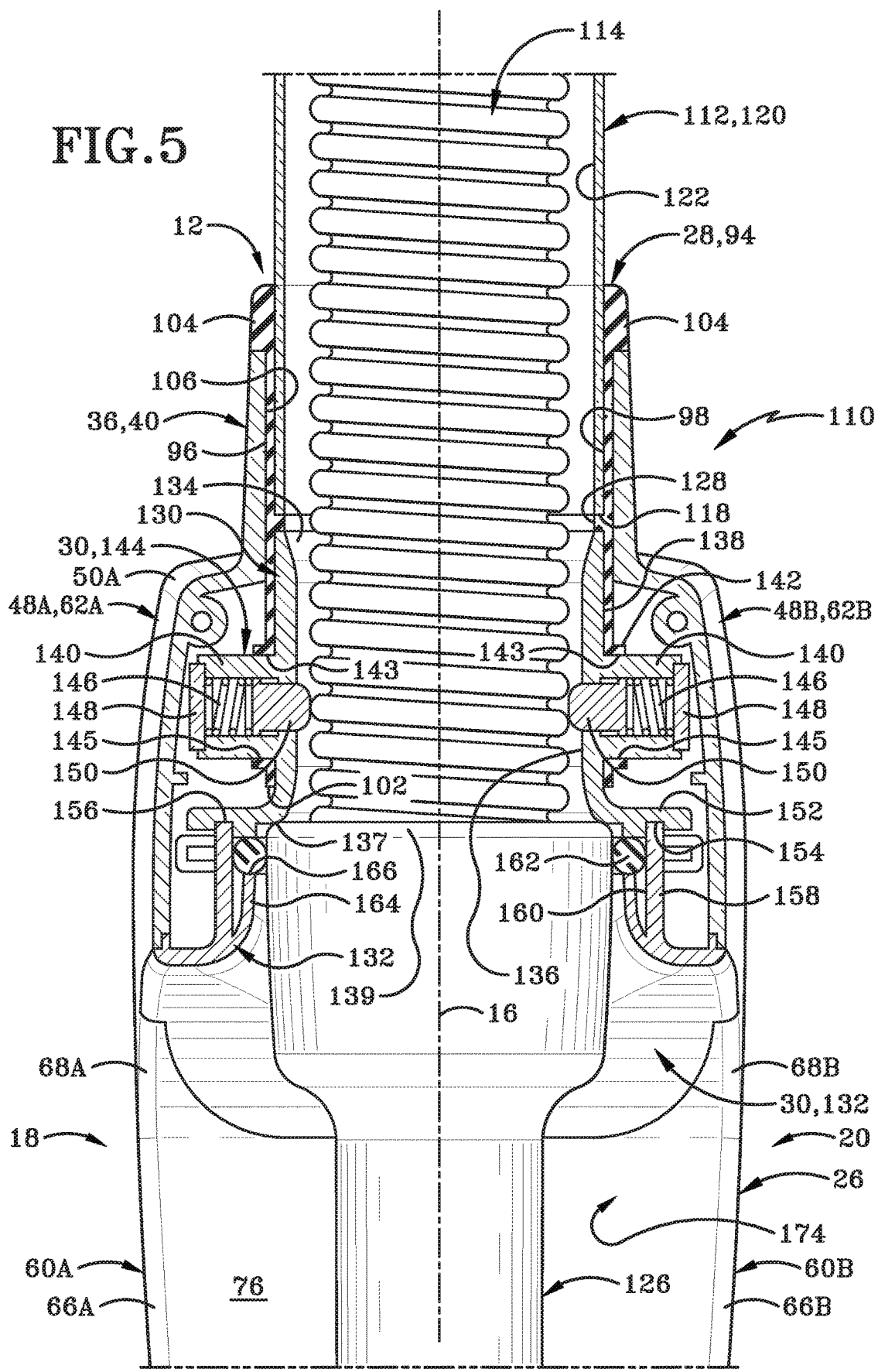
FIG. 5 is a front elevation cross-section view depicting the upper portion of the vacuum inlet valve assembly while a hose is depicted in its entirety.

With continued reference to FIG. 1-FIG. 3, the seal 28 is a substantially cylindrical member defining an upper edge 94 having an outer surface 96 and an inner surface 98. The seal 28 may be a cylindrical sleeve and may be referred to as sleeve seal 28. The length of the cylindrical seal 28 is centered along the longitudinal axis 16. The inner surface 98 of the seal 28 defines a cylindrical opening 100 or bore that is centered along the center longitudinal axis 16. The seal 28 extends from the upper edge 94 to a bottom edge 102 (FIG. 5). The seal 28 may include a downwardly protruding nub 104 on each side of the outer surface 96 of the seal 28. Particularly, the downwardly extending protrusions or nubs fit within the downwardly concave edge 38 defined by the cylindrical portion 34 of the housing 26.

As depicted in FIG. 5, when the seal 28 is installed and attached to the housing 26 of the vacuum inlet valve assembly 10, the outer surface 96 of the seal 28 is disposed inwardly from the inner surface of the cylindrical wall 40. The inner surface 106 of the cylindrical wall 40 has a larger diameter than the outer surface 96 of the seal 28. In one particular embodiment, the seal 28 may have an equal diameter with the inner surface 106 of the cylindrical wall 40 such that the outer surface 96 of seal 28 engages the inner surface 106 of the cylindrical wall 40 through a frictional interference fit. The upper edge 94 is positioned slightly above the edge 36 on the cylindrical portion 34.

With continued reference to FIG. 5, the seal 28 may be longer than the cylindrical wall 40 such that the bottom edge 102 of seal 28 is disposed vertically below the bottom end of cylindrical wall 40. Additionally, the bottom end 102 of seal 28 may be disposed below the horizontal wall 44 of housing 26. Even further, the bottom end 102 of seal 28 may be disposed below the edges 50A, 50B, and 52. As such, it is seen that the seal 28 extends from the uppermost portion of the vacuum inlet valve assembly 10 thereby defining the top 12 to an interior portion of the housing 26 below some of the upper components positioned above the horizontal wall 44.

The cylindrical portion 34 may include two similar bosses that extend rearwardly from a portion of the cylindrical wall 40. Namely, a first boss 108A and a second boss 108B extend rearwardly as a cantilevered projection defining a hole aligned offset parallel to the first transverse axis extending between the first side 18 and the second side 20. The aligned apertures are configured to receive a connector, such as a screw and complementary threaded nut, as depicted throughout the figures. As will be described in greater detail below, the aligned bosses are configured to flexibly tighten or constrict the cylindrical portion 34 to thereby seal the seal 28 against a conduit to create an effective seal.

With respect to the ball seal 32, while not depicted throughout the figures, it is understood that there may be springs that engage a horizontally extending pin which extends through a diametric hole formed in the ball seal 32. The ball seal 32 is located in a central channel formed in a bottom bracket internal to the housing 26 between the lower portions 64A, 64B of the respective sidewalls 48A, 48B. The V-shaped wall 90 acts and defines a downwardly extending ramp formed by a recess in the front wall 86 and the wall 84.

Figure 4:
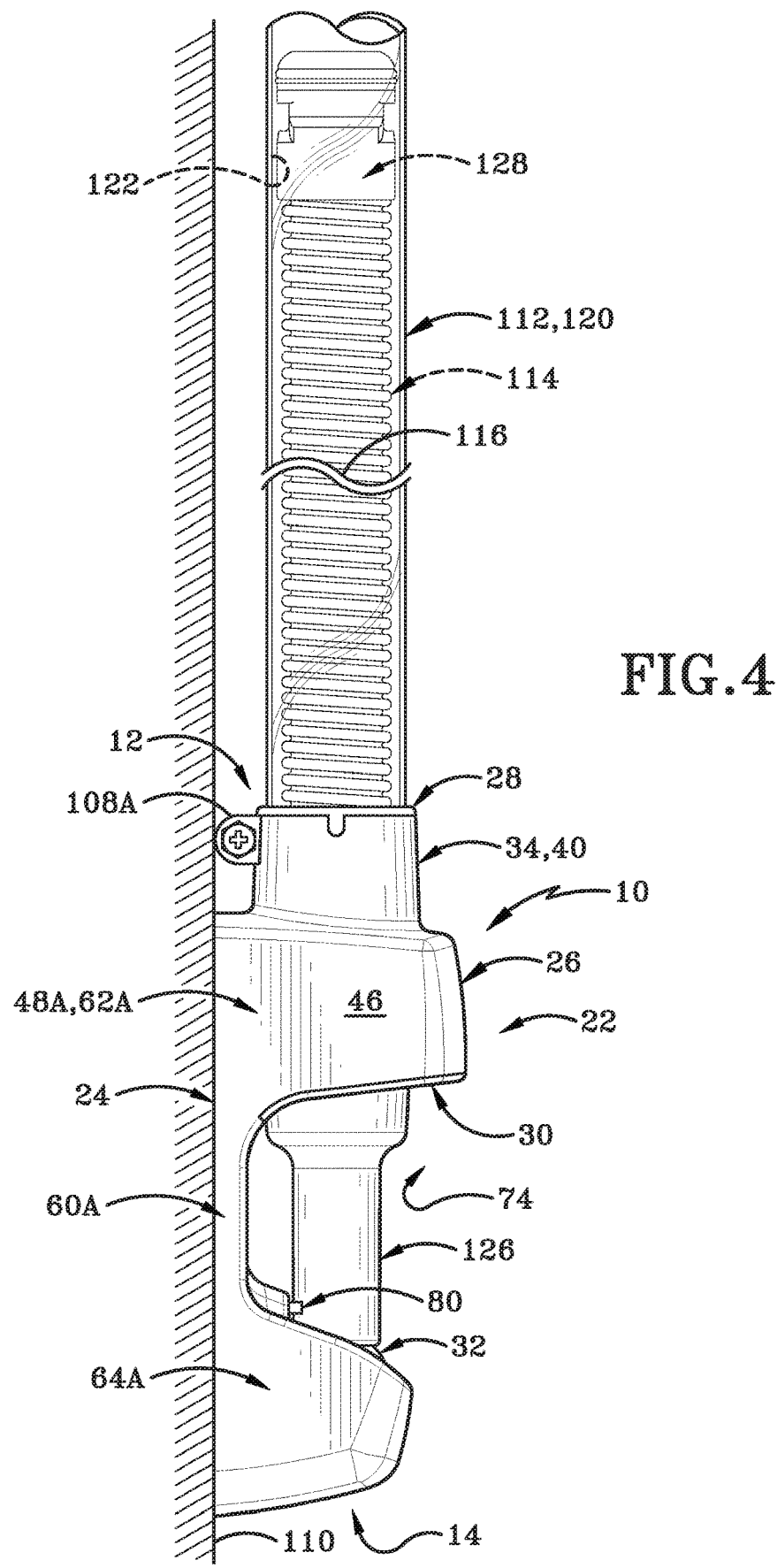
FIG. 4 is a first side elevation view of the vacuum inlet valve assembly attached to a preexisting wall of a structure with a clear conduit extending upwardly therefrom.

FIG. 4 depicts the vacuum inlet valve assembly 10 installed exterior to a wall 110 and connected with a vacuum tube conduit 112 that retains and houses a vacuum hose 114. In one particular embodiment, the wall 110 of the house or structure is a preexisting wall in the same. As such, the vacuum inlet valve assembly 10 is considered a secondary or after-market vacuum inlet valve assembly 10 for a central vacuum system. State otherwise, the wall 110 is constructed with the structure and then, sometime after the completion of the structure, the vacuum inlet valve assembly 10 may installed and connected to an exterior surface of the wall 110. This is in contradistinction with typical vacuum inlet valve assemblies for whole home vacuum systems which typically install the inlet valves during construction of the home such that portions of the inlet valves and conduits for the same are recessed within the wall. As such, the entirety of the system of which vacuum inlet valve assembly 10 is composed is exterior to the wall 110 of the home, except for some small minor mounting components, such as mounting screws, that would connect the vacuum inlet valve assembly 10 to the wall 110.

The length of the conduit 112 may be any length and the length of the hose 114 may be any length that is not longer than the conduit 112. Accordingly, a breakaway line 116 is depicted along the length of the hose 114 and the conduit 112 indicating that it may of any suitable length. The conduit 112 includes a lower terminal end 118 (FIG. 5) that is disposed within the opening 100 and aligned centrally along the vertical longitudinal axis 16. A cylindrical sidewall 120 of the conduit 112 extends away from the top 12 of the vacuum inlet valve assembly 10. In one particular embodiment, the cylindrical sidewall 120 that is most immediate the top 12 of the vacuum inlet valve assembly 10 is clear, translucent, or transparent such that the hose 114 may be viewed through the conduit 112. As will be described in greater detail below, the clear, transparent, or translucent cylindrical sidewall 120 enables an operator to see the hose 114 as the hose is being extracted from the vacuum inlet valve assembly 10. While the length of the clear section of the cylindrical sidewall extending up from the top 12 may be any suitable length, it is envisioned that in one particular embodiment, the length of the clear sidewall may be about two feet. Then, where the clear section of the cylindrical sidewall 120 terminates, traditional conduits, such as PVC tubing, may connect to the upper end of the cylindrical sidewall 120. While it is possible to form an entire conduit 112 of a clear cylindrical sidewall, it may be cost effective to only include a small portion of clear tubing at the uppermost portion, such as connecting with the top 12, of the vacuum inlet valve assembly 10. Alternatively, it would be entirely possible to have a substantially opaque tubing, such as a traditional PVC tubing, that is integrated with a window that would enable an operator to see the hose 114 that is capable of moving within the conduit 112.

Figure 6:
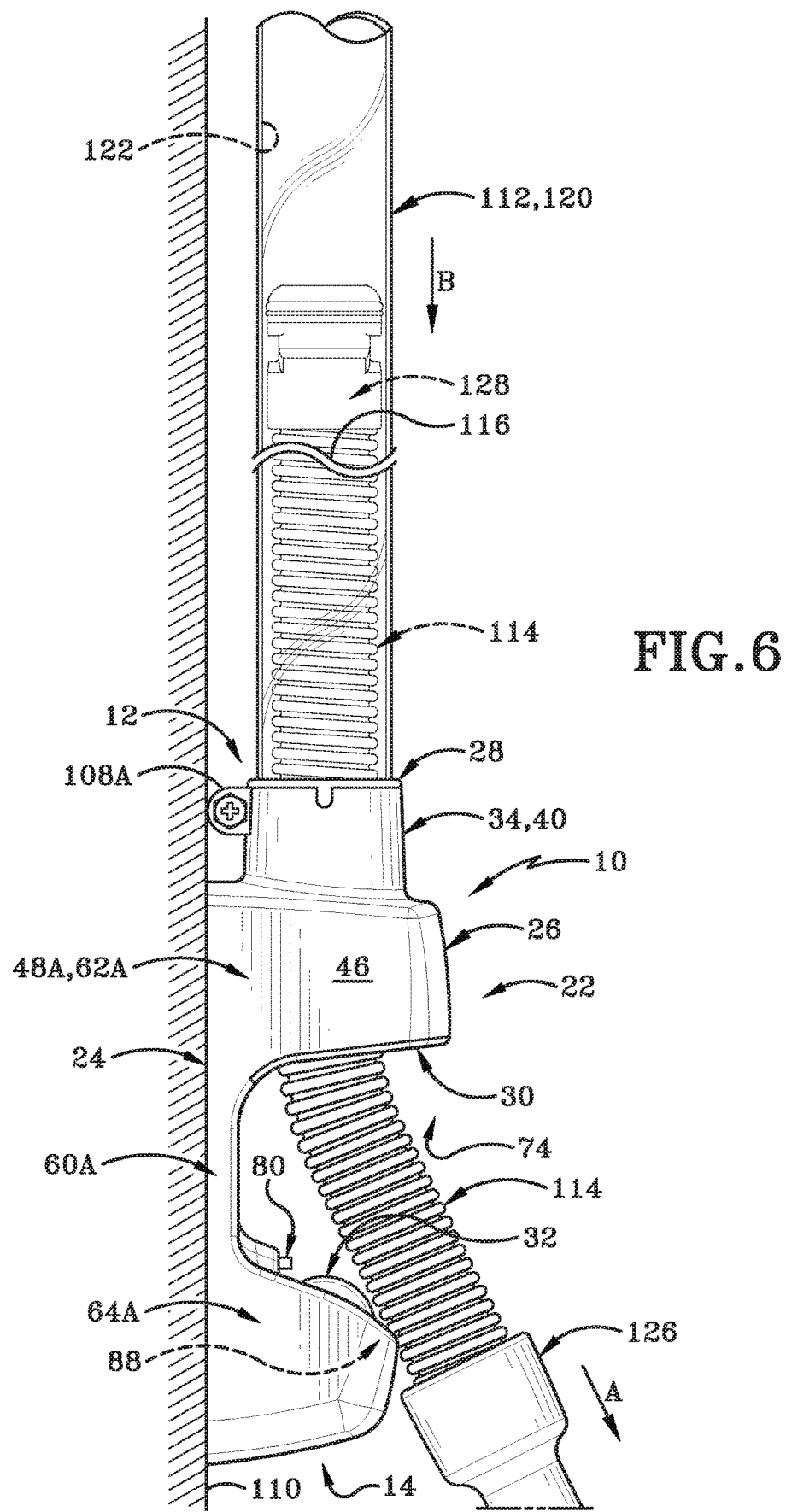
FIG. 6 is an operational first side elevation view depicting a hose being extracted from the vacuum inlet valve assembly.

As depicted in FIG. 5, the lower end 118 of conduit 112 contacts a ledge 124 formed in the inner surface 98 of seal 28. The ledge 124 extends radially inward towards the vertical longitudinal axis 16 defining an inner diameter that is substantially similar with an inner surface 122 of the cylindrical wall 120. Stated otherwise, ledge 128 includes a short vertical wall segment that is substantially coplanar with the inner surface of the cylindrical wall 120 defining the conduit 112. The hose 114 extends through the conduit 112 and includes a lower end 126 and an end cap 128 (which may also be referred to as a hose plug 128). The lower end 126 of the hose 114 may further be associated with a nozzle and may be referred to as nozzle 126. The nozzle 126 includes a lower edge defining an aperture that engages the ball seal 32 when the hose 114 is in the installed and sealed position depicted in FIG. 4. In this position, the ball seal 32 seals the aperture defined by the lower edge of the nozzle. As will be described in greater detail below, the hose 114 may be extracted from the vacuum inlet valve assembly 10 (as depicted in FIG. 6) so as to remove the nozzle 126 from its sealed connection with the ball seal 32 and draw the end cap or hose plug 128 downwardly towards the connection assembly 30. In some implementations, nozzle 126 may carry one or more low voltage wires that run through the hose and connect with the switch 80 or other conductor pins to allow the system to be turned on and off by toggling a secondary switch (not shown) at the nozzle 126. Alternatively, the nozzle 126 may include a radio frequency remote to control the operation of power to turn the system on and off. When low voltage wires are embedded in the hose, end contacts for the wires would be coupled and energized once hose was pulled all the way out and the locking pins snap into place. The connection of the end cap to the pins would ensure that the wires embedded in the hose establish an electrical connection thus conveying the ability to turn the system on and off to the handle end (i.e., nozzle 126) of the hose 114. Notably, the electrical current would not need to extend through the pins, rather, the pins lock the end cap in place which would have connectors to establish electrical communication with switch 80 or another electrical element.

The connection assembly 30 includes an upper portion 130 and a lower portion 132. While the connection assembly 30 is described as having a upper portion 130 and a lower portion 132, it is to be understood that it is possible for these two portions to be formed as one integral monolithic unibody structure. However, for the purposes of this disclosure, the upper portion 130 and the lower portion 132 are shown as two separate and distinct structures that are connected together. With respect to the upper portion 130, a tapered opening is defined by a tapered wall 134 at the upper end of the upper portion 130. The uppermost ledge of the tapered wall 134 nests and frictionally engages the ledge 124 on the seal 28. The tapered wall 134, at its uppermost end, includes a thickness that is complementary in width to the bottom edge of the ledge 124. From there, the tapered wall 134 angles downwardly and inwardly towards the longitudinal axis 16 so as to reduce the inner diameter of the inner surface 136 of the upper portion 130. The upper portion 130 includes an exterior surface 138 positioned interior to the inner surface 98 of seal 28. The inner surface 98 of the seal 28 adjacent its lower end 102 is positioned exterior from the exterior surface 108 of the upper portion 130. Particularly, the inner surface 98 of the seal 28 adjacent its lower end 102 is in a frictional interference fit with the outer surface 138 of the upper portion 130. The lower end or bottom 102 of seal 28 may include a transversely extending flange 142 at the bottom 102 that extends transversely outward away from the cylindrical portion of seal 28. An inner surface 143 of the flange 142 defines an opening 145 that stretches over an endwall 148 on a cylindrical portion 140 to connect with an outer or top surface 144 of the cylindrical portion 140.

Upper portion 130 further includes the hollow cylindrical portion 140 extending outwardly in a cantilevered manner in the first transverse direction from outer surface 138. The cylindrical portion 140 may define a hollow bore containing a compression coil spring 146 that is bound by an end wall 148 and in operable communication with a pin 150 extending through a transverse aperture formed in the upper portion 130. As will be described in greater detail below, the pin 150 is configured to interact with the end cap 128 to lock, in a releasable manner, the end cap 128 to the connection member 130 so as to create a vacuum seal to thereby enable vacuum suction to flow through the hose 114 when the hose 114 is in its extracted position relative to the vacuum inlet valve assembly 10.

The compression coil springs enable the pins 150 to move in a transverse direction between a collapsed position and an extended position. When the pins 150 are in the extended position, they engage a complementary channel 168 formed in the end cap 128 in order to releasably connect the same to the connection assembly 30. When the pins 150 are in the collapsed position, the hose 114 is able to freely bypass and move along the pins 150 that are collapsed by pushing the spring 146 in a direction along the transverse axis 15.

A bottom end flange 152 of the upper portion 130 may include a downwardly facing notch 154. Notch 154 may be an annular recess circumscribing the longitudinal axis 16. The notch 154 receives a portion of the lower portion 132 therein. More particularly, lower portion 132 includes a upwardly extending wall 156 that is complementary in shape and size to the notch 154 and is mated or inserted therein. Wall 156 on the lower portion 132 may be generally cylindrical, at a short height, and include an outer surface 158 and an inner surface 160. An annular seal 162 is disposed radially inwardly from the inner surface 160. The seal 162 forms a seal between the lower portion 132 and the upper portion 130. The seal is retained by a shortened wall 164 that is curved radially inward and terminates at a lower vertical height than wall 156. More particularly, an upper end 166 is disposed radially inward from the inner surface 160 of wall 156 and supports thereon the annular seal 162 such that the annular seal 162 is sandwiched between the upper end 166 of wall 164 and a bottom surface of the ledge 152 of the upper portion 130. In one particular embodiment, the lower portion 132 is chemically bonded, such as through a high strength adhesive, to the upper portion 130 by inserting the chemical bonding in the notch 154 and press-fitting the same together in order to sandwich the seal 162 between the upper end 166 of wall 64 and a bottom surface of the flange 152. While the annular seal 166 is shown as having a circular cross-section, it is entirely possible that other dimensional shapes or configurations of the annular seal 162 are possible provided that the annular seal 162 surrounds the entire circumference of the hose 114. Further, while the annular seal 162 is shown interior of the inner surface 160 of wall 156, it is possible that other portions of the lower portion 132 may be rearranged to position the annular seal 162 in other locations.

In accordance with one exemplary aspect, the vacuum inlet valve assembly 10 provides a housing that is configured to mount external of an existing wall 110 within a structure. In one particular embodiment, the wall 110 is a garage wall that defines the interior portion of the garage such that the vacuum inlet valve assembly 10 is in the interior of the garage. This enables the vacuum inlet valve assembly 10 to be part of a central vacuuming system that is an after-market portion or device installed subsequent to the construction of the home. In one particular example, a user may install a vacuum device with a conduit that connects to the clear conduit 112 and the vacuum inlet valve assembly 10. The hose 114 can be used in the garage to vacuum cars or other items within the garage. Additionally, according to one aspect, and as is known in the art, the vacuum suction device may be reversed by either (i) altering current to reverse the fan, or reversing the fan in any other known manner, or (ii) plugging the other end of hose 114 into a blow hole on the vacuum suction device so that the hose 114 becomes a blower. When this blower mode is used, the end or nozzle 126 of the hose 114 can be used to dry small components, such as when washing and detailing a motorcycle.

In operation and with reference to FIG. 6, the nozzle 126 may be lifted and removed from its sealed relationship with the ball seal 32 and extracted by pulling the hose 114 downwardly and outwardly, as indicated by arrow A. When the operator pulls the hose 114 in the direction of arrow A, the end cap 128 moves downwardly through the conduit 112, and more particularly, through the clear tube or clear cylindrical wall 120 so as to enable the user to view the end cap 128 as it approaches the vacuum inlet valve assembly 10 in the downward direction as indicated by arrow B. It is advantageous for the user to view the end cap 128 as it approaches the top of the vacuum inlet valve assembly 10 because portions of the end cap 128 interlock and releaseably engage the pins 150 in the connection assembly 30.

Figure 7:
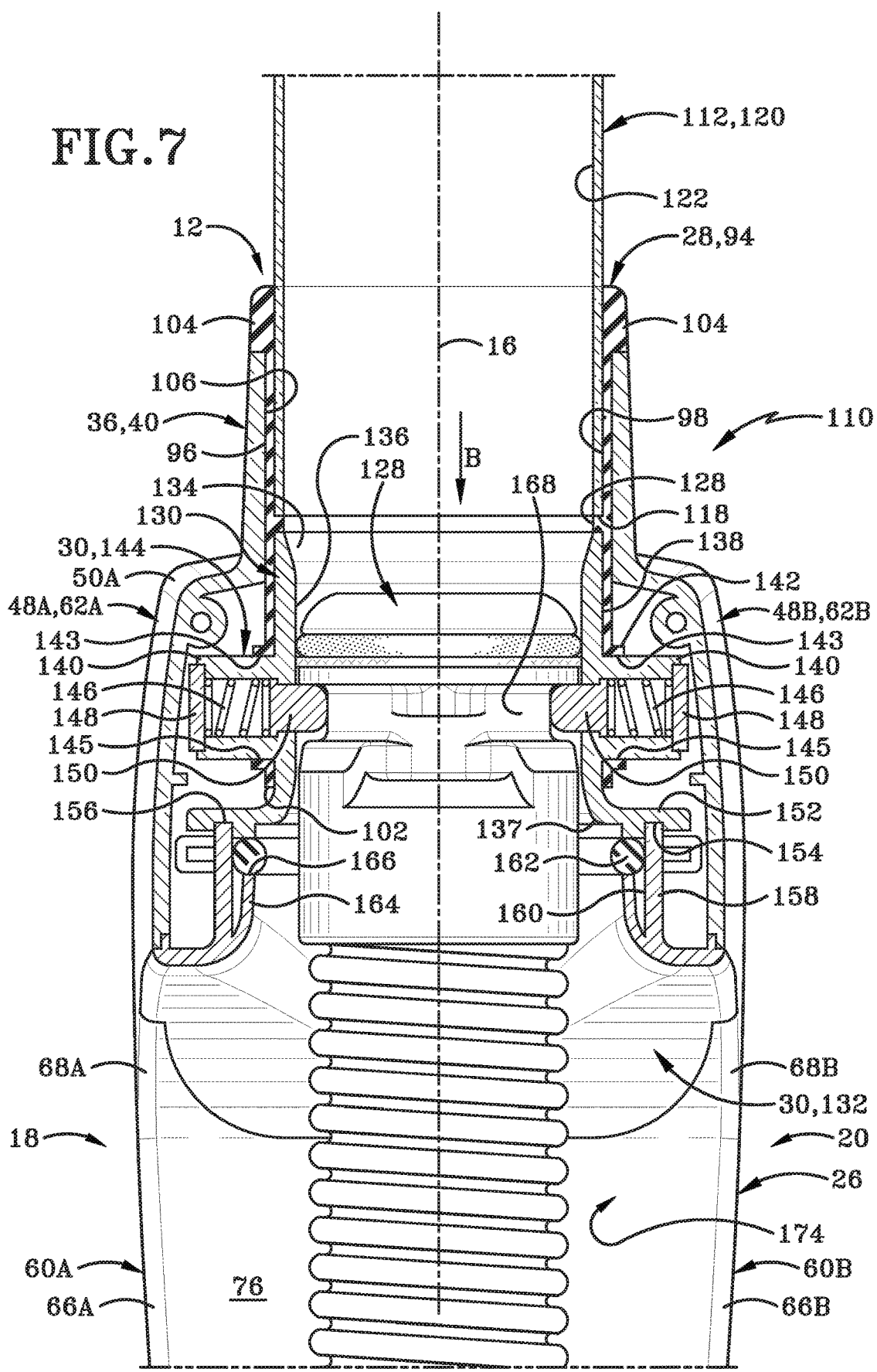
FIG. 7 is a front elevation cross-section view of the upper portion of the vacuum inlet valve assembly with the end cap of the hose shown in full detail.

As depicted in FIG. 7, as the hose 114 is continued to be extracted in a downward direction as indicated by arrow B, the end cap 128, which defines an annular recess or annular channel 168, engages the pins 150 to releaseably connect the end cap 128 to the connection device 30.

The end cap 128 or hose plug 128 may include a first section, a second section, a first seal or O-ring, and a second seal or felt ring. End cap 128 or hose plug 128 includes a first end opposite a second end aligned along the longitudinal axis 16. Some portions of the hose plug will be described relative to the longitudinal axis 16 and may be used in conjunction with the terms circumferential, or radial, relative to the longitudinal axis.

The first section of end cap 128 or hose plug 128 includes a first end, which also defines first end of the end cap 128 or hose plug 128. First end extends circumferentially around longitudinal axis 16 and defines an inner annular edge defining an opening. A cylindrical inner surface extends longitudinally from inner edge to an opposing second end. An annular chamfered edge is adjacent to the second end and defines a second opening. The chamfered edge circumscribes longitudinal axis such that a first bore defined by the cylindrical inner surface extends between the first opening and the second opening.

The first section of the end cap 128 or hose plug 128 may further include an annular exterior curved wall, which curves downwardly from the first end and curves radially outward from the longitudinal axis 16. The annular curved wall is convexly curved between the first end and a terminal end, which is the radial outermost portion of the first section. A first ledge extends radially inward from the terminal end to a wall that extends generally parallel to the longitudinal axis. A second ledge extends radially inward from the wall. The second ledge extends radially inward to a longitudinally extending exterior cylindrical wall. A cylindrical wall extends longitudinally to the second end.

The first ledge is positioned closer to the first end than the second edge. Stated otherwise, the second edge is positioned closer to the second end than the first ledge. The first ledge has a radius that is larger than the second ledge. The first ledge is an annular ledge that extends circumferentially around the longitudinal axis 16. The second ledge is an annular ledge that extends circumferentially around the longitudinal axis 16. The first ledge and the second ledge are concentric about the longitudinal axis 16. The longitudinally aligned length of cylindrical wall is greater than that of wall and curved wall. In one particular embodiment, the length of cylindrical wall may be greater than the sum of the longitudinal length of wall and curved wall; however, other dimensional configurations are possible. Collectively, the curved wall, the first ledge, the wall, the second ledge, and the cylindrical wall define an outer surface of the first section that faces radially outward from the longitudinal axis. In one particular embodiment, first section is formed from a uniform, monolithic member formed from a suitably rigid material so as to withstand deformation when the vacuum system of the present disclosure is in operation. First section may be fabricated from a polymer material; however, other rigid materials are entirely contemplated such as metal. Furthermore, the integral structure of the first section may be formed from multiple elements having similar configurations as one having ordinary skill in the art would understand.

The first seal on the end cap 128 or hose plug 128 is a generally annular or O-ring-like member defining an interior aperture. In one particular embodiment, first seal on the end cap 128 or hose plug 128 is generally shaped like a torus such that it has a convexly curved continuous outer surface. The first seal on the end cap 128 or hose plug 128 may generally be referred to as an O-ring having elastomeric properties. The first seal on the end cap 128 or hose plug 128 is circular in cross section, having an interior diameter. The diameter of this first seal has a dimension that is greater than the radially aligned length of first ledge on the end cap 128 or hose plug 128. The diameter of the cross section of first seal on the end cap 128 or hose plug 128 enables the outer tangential edge of the first seal to extend radially outward from the terminal end of the curved wall. The first seal on the end cap 128 or hose plug 128 includes an inner diameter measured through the longitudinal axis 16 between opposing inner tangential edges. The inner diameter of the first seal on the end cap 128 or hose plug 128 is slightly greater than a diameter of the first section measured through longitudinal axis 16 between opposing walls between the first and second ledges. The first seal on the end cap 128 or hose plug 128 is configured to snugly fit and nest and seal along the inner surface 136 of wall 130. The inner surface 136 of wall 130 includes a horizontal portion that acts as a seat and retains a collar or annual edge 139 on the nozzle 126.

The second seal on the end cap 128 or hose plug 128 is positioned towards the second end from the first seal. The second seal on the end cap 128 or hose plug 128 is an annular member defining an interior aperture that is concentric about the longitudinal axis 16 and is concentric with the first seal, Unlike the first seal on the end cap 128 or hose plug 128, which has a continuous convexly curved outer surface, the second seal on the end cap 128 or hose plug 128 includes an annularly planar first surface and an opposing annularly planar second surface. A short longitudinally-extending cylindrical side wall extends between the first surface and the second surface. An inner cylindrical side wall extends between the first surface and the second surface.

The second seal on the end cap 128 or hose plug 128 includes an inner diameter, which is measured between opposing inner walls, extending through the longitudinal axis 16. The inner diameter of the second seal on the end cap 128 or hose plug 128 may be less than the inner diameter of the first seal on the end cap 128 or hose plug 128. The inner diameter of the second seal on the end cap 128 or hose plug 128 is configured to be slightly larger than the outer diameter of the first section measured between opposing cylindrical walls through the longitudinal axis 16. Accordingly, the second seal on the end cap 128 or hose plug 128 is configured to snugly fit adjacent the inner surface 136 of wall 130, positioned below the first seal.

The second seal on the end cap 128 or hose plug 128 may be fabricated from a type of fabric material such as felt. In one particular embodiment, second seal on the end cap 128 or hose plug 128 provides a sealing arrangement that is flexible in the manner so as to prevent debris and other aggregate materials from passing by the second seal on the end cap 128 or hose plug 128 when it is engaged with a portion of the connection assembly 30 or the conduit 112. However, it is envisioned that felt-like material forming the second seal on the end cap 128 or hose plug 128 does not need to be completely air-tight or hermetic because the first seal on the end cap 128 or hose plug 128 establishes the hermetic seal between the hose plug and an inner surface of the connection assembly 30. However, it is clearly envisioned that the second seal on the end cap 128 or hose plug 128 may form a hermetic seal and include the properties of precluding aggregate materials or other dust particles from passing thereby. Furthermore, while it is envisioned that the elastomeric first seal on the end cap 128 or hose plug 128 be positioned closer to the first end of the hose plug 128, it is entirely possible for the first and second seals to be switched such that the felt material of the second seal on the end cap 128 or hose plug 128 is positioned closer to the first end.

Second section on the end cap 128 or hose plug 128 includes a first end opposite a second end aligned along the longitudinal axis 16. The first end is defined by an annular surface bound by an outer edge and an inner edge defining an opening. A cylindrical wall extends downwardly from the first end to a terminal end. A ledge extends radially inward from the terminal end to an inner cylindrical wall. In one particular embodiment, cylindrical wall and cylindrical wall are substantially parallel to the longitudinal axis 16. Additionally, the ledge is substantially perpendicular to the longitudinal axis.

The second section on the end cap 128 or hose plug 128 includes a first end opposite a second end aligned along the longitudinal axis 16. The first end is defined by a planar annular surface bound by an outer edge and an inner edge defining an opening. A cylindrical wall extends downwardly from the first end to a terminal end. A ledge extends radially inward from the terminal end to an inner cylindrical wall. In one particular embodiment, cylindrical wall and cylindrical wall are substantially parallel to the longitudinal axis 16. Additionally, the ledge is substantially perpendicular to the longitudinal axis 16. The ledge extends in a radial manner between the terminal end and an inner corner. In one particular embodiment, the ledge is a continuous annular edge having a radially aligned length between the terminal end and the inner corner that is in a dimensional range slightly greater than the first ledge. The inner cylindrical wall extends longitudinally between the inner corner and a second inner corner. The longitudinal length of the inner cylindrical wall, between the first and second inner corners is slightly longer than the dimensional length of the pin 150. Portions of the pin 150 are configured to engage the inner wall in a contacting manner. The bottom ledge extends radially outward from the second corner to an outer end. In one particular embodiment, the lower ledge faces an opposite direction of the ledge such that the faces of the ledges face each other. In one particular embodiment, the surface defined by the ledge is not continuous inasmuch as a portion of the second section defines a longitudinally aligned slot. Collectively, the ledge, the inner wall, and the second ledge define an annular channel configured to receive the pin(s) 150 therein. The annular channel extends substantially around the end cap 128 or hose plug 128 concentrically about the longitudinal axis 16.

The second section on the end cap 128 or hose plug 128 includes an inner surface extending from the first end to the second end. An inner annular edge defines a second end opening such that a hollow bore is in open communication with the hose 114. The inner surface may further include spiraling threads, which are sized to threadably connect with a portion of the hose 114. More particularly, the threads are configured to threadably mate with the distal end of the hose 114. Stated otherwise, the hose 114 is configured to be inserted into the bore of second section by inserting the distal end of the hose 114 through the second end opening and releasably and threadably attaching the second section to the hose 114 via the threads, which mate with an exterior portion of the hose 114. However, it is to be understood that the end cap 128 or hose plug 128 may be embodied similar to the other embodiment contained herein such that the cylindrical side wall of the second section is inserted into the distal end of the hose 114, and secured by a frictional interference fit or another type of connection fit such as a mechanical connection, such as a screw, or a chemical connection, such as an adhesive.

The end cap 128 or hose plug 128 includes a first cam that extends radially outward from the longitudinal axis 16. First cam is positioned within annular channel. First cam is connected with the inner cylindrical wall, includes a lower edge that is positioned between the ledges. Accordingly, a portion of the annular channel extends continuously below the lower ledge of the first cam and above one ledge. The portion of the annular channel extending below the lower ledge is in open communication with the slot that is longitudinally aligned with the first cam relative to the longitudinal axis 16. The slot extends towards the second end to a lower ledge. The pin 150 is able to bypass the first cam and slide down into the slot by crossing through the portion of the channel that is positioned below the lower ledge and above the ledge.

The first cam includes mirroring sloped surfaces. More particularly, first cam includes a first sloped surface and a second sloped surface. In one particular embodiment, the surfaces are convexly curved between an apex of the cam and the inner cylindrical wall. In another particular embodiment, the surfaces for are concavely curved between the apex and the inner cylindrical. The apex may define a convexly curved protrusion configured to depress the pin 150 retained within the connection assembly 130.

FIG. 7 depicts an enlarged view of the end cap 128 or hose plug 128 inserted into the connection assembly 130 with the pins 150 disposed in the annular channel. In this connected position, the end cap 128 or hose plug 128 is secured within the connection assembly. The first and second seals engage an inner surface 136. The double seal of the first and second seals ensure the hose plug 128 adequately seals the conduit such that the vacuum suction extends fully through the conduit of the hose 114, and not there around.

In order to remove the hose plug 128 from the connection assembly 30, an operator will rotate the hose plug 128 about the longitudinal axis 16. A slight downward force may be pulled on the hose 114 to establish a physical connection between the pins 150 and the ledge. The pins 150 ride along the ledge and are rotated. The cams will engage the respective diametrically opposite pins 150 and depress the same. When the buttons are fully depressed and are substantially even with the aperture formed in the wall of the section 130, the hose plug 128 may be longitudinally pulled outward.

There may be instances in which the rotation of hose plug 128 occurs, but the desired effect is not to pull the hose plug 128 from its releasable connection with the connection assembly 30. In these scenarios, the hose plug 128 may be rotated with a slight inward pressure, such that the pins 150 do not ride along the upper edge and get depressed by the first and second cams. Rather, the slight inward pressure enables the pins 150 to slide down within the slots. When the pins 150 are in the slots, a user may continue to forcibly push the hose plug and rotate the hose plug. This will allow the pins 150 to depress as they are urged inward by the sloped walls, which are positioned on either side of the slots. The sloped walls may push in the pins 150, so as to be substantially even with the inner surface 136, and the tapered wall may continue to maintain the pins 150 in a depressed and retracted state as the hose plug 128 is continued to be pushed inwardly.

With the end cap 128 or hose plug 128 engaged with the connection assembly 30, the operator may switch by activating the switch 80 to turn on the vacuum device that is remote from the vacuum inlet valve assembly 10. The user may then manipulate the nozzle 126 of the hose 114 to vacuum a desired item. In one particular embodiment, when the vacuum inlet valve assembly 10 is installed within a garage, the operator may vacuum a workstation, such as a table saw or other woodworking device, in order to vacuum sawdust or may vacuum a vehicle, such as a car. In other particular implementations, an operator may reverse the flow of air by actuating an element on the vacuum device (not shown). The reversal of the flow may be accomplish by inserting an opposite end of hose 114 into a blow hole on the vacuum device. Thus, when turning the switch on, the vacuum device may act as a blower. In some instances, high precision detailing of automobiles requires that some components are blown dry when regular towels are ineffective to dry small cracks and crevices. As such, a vehicle, such as a motorcycle, can be positioned near the nozzle 112 and the vacuum device may be activated so as to operate as a blower to blow air into the crevices and cracks of the motorcycle in order to dry the same and perform high precision vehicle detailing.

Having thus described the structure of valve 10 and an exemplary method of operation, reference will now be made to its assembly. Valve 10 may be assembled by providing the housing 26. Then, the seal 28 may attached to the connecting assembly 30 by stretching the flange 142 over the cylindrical portion 140 and allowing the seal 28 to extend vertically therefrom. Then, the connecting assembly 30 and the seal 28 may be inserted through the front of the housing 26 and upwardly into the same such that the seal 28 is upwardly and slideably connected with the cylindrical portion 36 and moved along axis interior to the inner surface 106. The nubs 104 are disposed within the arcuate cutout 38 to arrest or reduce the likelihood that the seal 28 slides downwardly from its disposition within the cylindrical portion.

With the assembly in this position, an installer may mount the assembly 10 to the wall 110 such that the front 22 of the assembly face outward. Then, the installer may connect the clear conduit 112 to the seal 28 and tighten the connecting member to the bosses 108A, 108B to create a seal between seal 28 and the outer surface of the cylindrical wall 120, The other end of the conduit may be coupled, either directly or indirectly, to a vacuum source. Recall, the vacuum source may be selectively altered between a vacuum mode and a blower mode. Once assembled and installed, by this exemplary manner, the operator may use the valve 10 in accordance with the matter discussed above.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

As used herein in the specification and claims, the term "preexisting" or "preexisting wall" refers to a wall or wall-like structure that was previously constructed and is complete. The preexisting wall is fully assembly such that the vacuum inlet valve assembly is considered a supplemental device to the constructed wall and it is not installed in the wall during construction thereof. Furthermore, the phrase "exterior to a preexisting wall within a structure" refers to the location of components of the vacuum inlet assembly. For example, "exterior" does not require that the components be outside the building or structure, rather "exterior the preexisting wall" refers to the component being located outside the wall while still within the structure such as inside a room or in a garage (which is in contradistinction to conventional whole-home vacuum systems that are inset in the wall during construction of the structure).

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A vacuum inlet valve assembly comprising:
   a housing having an upper cylindrical portion;
   a sleeve seal disposed within the upper cylindrical portion;
   a conduit coupled with the upper cylindrical portion and sealed with the sleeve seal;
   a lower wall of the housing that defines an aperture;
   a ball seal disposed within the aperture sized to seal an open end of a vacuum hose; and
   a rear end of the housing that is mounted on a preexisting wall to dispose the vacuum inlet valve assembly and the conduit exterior of the preexisting wall.

2. The vacuum inlet valve assembly of claim 1, further comprising:
   wherein the vacuum hose is exterior the preexisting wall and is disposed within the conduit that is exterior to the preexisting wall.

3. The vacuum inlet valve assembly of claim 1, further comprising:
   a lower terminal end of the conduit disposed within the upper cylindrical portion.

4. The vacuum inlet valve assembly of claim 3, further comprising:
   a ledge on the sleeve seal that extends radially inward from an inner surface of the sleeve seal, wherein the lower terminal end of the conduit engages the ledge.

5. The vacuum inlet valve assembly of claim 1, further comprising:
   at least a portion of the conduit is clear to enable a vacuum hose to be viewed within the conduit.

6. The vacuum inlet valve assembly of claim 5, wherein the portion of the conduit that is clear is about two feet in length.

7. The vacuum inlet valve assembly of claim 1, further comprising:
   a connection assembly having upper portion and a lower portion.

8. The vacuum inlet valve assembly of claim 7, further comprising:
   a tapered opening formed in the upper portion that is aligned with upper cylindrical portion and the conduit, and an uppermost ledge of the tapered opening engages a ledge of the sleeve seal.

9. The vacuum inlet valve assembly of claim 1, further comprising:
   at least one nub on the sleeve seal that is disposed in a cutout portion of the upper cylindrical potion shaped complementary to the at least one nub.

10. The vacuum inlet valve assembly of claim 1, wherein the housing further includes:
    a first sidewall;
    a narrow portion positioned between an upper portion of the first sidewall and a lower portion of the first sidewall.

11. The vacuum inlet valve assembly of claim 10, wherein the upper portion of the first sidewall has a greater width than the narrow portion and wherein the lower portion of the first sidewall has a greater width than the narrow portion but less than the width the upper portion.

12. A method comprising:
    mounting a vacuum inlet valve assembly exterior to a preexisting wall within a structure;
    coupling a conduit to the vacuum inlet valve assembly, wherein the conduit is exterior to the preexisting wall;
    disposing a hose within the conduit;
    moving an end of the hose towards the vacuum inlet valve assembly through the conduit exterior to the preexisting wall;
    coupling the end of the hose to vacuum inlet valve assembly exterior to the preexisting wall; and
    moving air through the hose in response to operation of a vacuum source.

13. The method of claim 12, further comprising:
    altering a direction of air movement through the hose; and
    blowing air outwardly through a nozzle of the hose.

14. The method of claim 12, further comprising:
    viewing the end of the hose through a clear portion of the conduit exterior to the preexisting wall.

15. The method of claim 14, further comprising:
    unsealing a nozzle on the hose from a ball seal on the vacuum inlet valve assembly;
    extracting the hose from the vacuum inlet valve assembly; and
    moving the end of the house downwardly through the clear portion of the conduit exterior the preexisting wall.

16. The method of claim 15, further comprising:
    engaging pins in the vacuum inlet valve assembly with a channel formed in the end of the hose;
    rotating the end of the hose about an axis;
    depressing the pins with cams formed in the end of the hose during rotation of the end of the hose; and
    pulling the end of the hose downwardly while the pins are depressed to remove the end of the hose from the vacuum inlet valve assembly.

17. A vacuum inlet valve assembly comprising:
    a housing having an upper cylindrical portion;
    a sleeve seal disposed within the upper cylindrical portion, the sleeve seal defining a first aperture formed near a lower end of the sleeve seal sized to receive a transverse cylindrical portion of the housing therethrough;
    a conduit coupled with the upper cylindrical portion and sealed with the sleeve seal;
    a lower wall of the housing that defines a second aperture;
    a ball seal disposed within the second aperture sized to seal an open end of a vacuum hose; and
    a rear end of the housing that is mounted on a preexisting wall to dispose the vacuum inlet valve assembly exterior of the preexisting wall.

18. The vacuum inlet valve assembly of claim 17, further comprising:
    a spring disposed within the transverse cylindrical portion configured to move a pin into engagement with a channel formed in a hose plug, wherein the spring is disposed through the aperture formed near the lower end of the sleeve seal.

19. A vacuum inlet valve assembly comprising:
    a housing having an upper cylindrical portion;
    a sleeve seal disposed within the upper cylindrical portion;

a conduit coupled with the upper cylindrical portion and sealed with the sleeve seal, wherein at least a portion of the conduit is clear to enable a vacuum hose to be viewed within the conduit;

a lower wall of the housing that defines an aperture;

a ball seal disposed within the aperture sized to seal an open end of a vacuum hose;

a rear end of the housing that is mounted on a preexisting wall to dispose the vacuum inlet valve assembly exterior of the preexisting wall.

20. A vacuum inlet valve assembly comprising:

a housing having an upper cylindrical portion, wherein the housing further includes: a first sidewall; and a narrow portion positioned between an upper portion of the first sidewall and a lower portion of the first sidewall, wherein the upper portion of the first sidewall has a greater width than the narrow portion and wherein the lower portion of the first sidewall has a greater width than the narrow portion but less than the width the upper portion;

a sleeve seal disposed within the upper cylindrical portion;

a conduit coupled with the upper cylindrical portion and sealed with the sleeve seal;

a lower wall of the housing that defines an aperture;

a ball seal disposed within the aperture sized to seal an open end of a vacuum hose; and a rear end of the housing that is mounted on a preexisting wall to dispose the vacuum inlet valve assembly exterior of the preexisting wall.

* * * * *